United States Patent [19]

Duchesneau et al.

[11] Patent Number: 5,141,399

[45] Date of Patent: Aug. 25, 1992

[54] PITCH CHANGE CONTROL SYSTEM

[75] Inventors: Jerome G. Duchesneau, Andover; Robert A. Schwartz, Vernon, both of Conn.

[73] Assignee: United Technologies Corporation, Hartford, Conn.

[21] Appl. No.: 600,644

[22] Filed: Oct. 18, 1990

[51] Int. Cl.⁵ .............................................. B64C 11/38
[52] U.S. Cl. ............................. 416/157 R; 416/165
[58] Field of Search ............... 416/153, 154, 156, 157, 416/162, 165

[56] References Cited

U.S. PATENT DOCUMENTS

| | | |
|---|---|---|
| 2,501,720 | 3/1950 | Godden et al. .................. 416/157 R |
| 3,171,494 | 3/1965 | Liaaen .............................. 416/157 R |
| 4,365,937 | 12/1982 | Hiebert et al. .................. 416/157 R |

Primary Examiner—Edward K. Look
Assistant Examiner—James A. Larson
Attorney, Agent, or Firm—William W. Habelt

[57] ABSTRACT

A pitch change actuation system is disclosed for adjusting the pitch of a variable pitch propeller blade (20) rotatably mounted to a hub (10) of the propeller. The pitch change actuator comprises a blade actuation piston (30) operatively connected to the propeller blade (20), a pitchlock piston (50) having a longitudinally directed annular shaft (56) extending therefrom about the shaft (34) of the blade actuation piston (30), pitchlock assembly (130, 140, 150) operatively interconnected between the pitchlock piston (50) and the blade actuation piston (30) for restraining inadvertent blade pitch reduction, bias spring (60) for exerting a preload force against the pitchlock piston (50), and fluid supply conduit (70) operatively interconnected in fluid communication between control valve (100) and the pitch change actuator.

4 Claims, 2 Drawing Sheets

PITCH CHANGE CONTROL SYSTEM

TECHNICAL FIELD

This invention relates to aircraft propeller systems of the variable pitch type in general and, more particularly, to a system for adjusting the pitch of a variable pitch propeller.

BACKGROUND ART

Variable pitch propeller systems typically incorporate a plurality of propeller blades mounted to a rotary hub driven by the aircraft's engine, with each propeller blade extending radially outwardly from the hub along the longitudinal axis of the blade. In order to permit pitch adjustment, each blade is mounted to the hub for pivotable movement about its longitudinal axis. The hub typically encloses a chamber within its interior wherein a pitch change actuation system is disposed in operative association with the propeller blades. The actuation system functions to selectively change the pitch of the blades thereby altering air resistance to the rotation of the blades to thereby control engine speed.

In most modern aircraft, the pitch change actuator is of the hydromechanical type wherein an output member, typically a piston, is driven in response to adjustments in the pressure of the hydraulic fluid which drives the actuator. The adjustments in fluid pressure are typically affected by either a hydromechanical or electronic control system which monitors engine speed and causes, by way of collateral apparatus, a change in fluid pressure whenever the monitored engine speed departs from the desired engine speed setting.

Such hydromechanical pitch change actuation systems are well known in the art. For example, commonly assigned U.S. Pat. No. 4,523,891 to Schwartz and Duchesneau discloses a conventional pitch actuation system wherein each propeller blade is operatively connected to a piston which is driven by the pressure of a fluid which is selectively directed in response to a departure from desired engine speed against the opposite faces of the piston thereby causing a linear displacement of the piston and a resultant change in pitch of the blades operatively connected to the piston. The piston is reciprocally moveable within a cylinder disposed within the hub about a torque tube which extends from the fluid supply to the piston. As shown in U.S. Pat. No. 4,523,891, the pressure fluid is conveyed through a conduit within the torque tube from the fluid supply to a valve associated with the piston which, depending upon its position, selectively directs the fluid against either the front or the rear face of the piston thereby causing the piston to move linearly thereby rotating the blade or blades associated therewith to effectuate the change in pitch. The position of the valve directing the fluid to this piston is controlled by the rotation of a ball screw operatively connected to the longitudinally opposite end of the torque tube, typically by a quill and spline arrangement, such that the torque tube rotates with the ball screw. Rotation of the torque tube results in a corresponding rotation of a of second screw, termed a pitch lock screw, mounted to the valve, which in turn causes the valve to linearly translate in a longitudinal direction so as to selectively register the valve relative to the piston. The system is designed to safeguard against inadvertent pitch reduction by failing operational at the last commanded pitch angle in the event of a loss in fluid pressure thereby avoiding excessive pitch fining and an undesirable increase in drag. The drawback to this type of system is its complexity, and the inherent backlash associated therewith and its effect on synchrophasing accuracy.

In an alternative prior art pitch change actuation system, two independent conduits may be provided within the an elongated non-rotating tube with one of the conduits directing fluid from the supply to the front face of the piston and the other conduits directing fluid from the supply to the rear face of the piston. In such a case, a valve system meters fluid from the supply selectively between the two conduits so as to cause the correct directional movement of the piston. The ball screw and pitch screw arrangement of the system disclosed in U.S. Pat. No. 4,523,891 is not utilized in this type of system. Due to the lack of a pitch lock screw, a counterweight is provided on the blade shaft which prevents a reduction in blade pitch in the event of inadequate fluid pressure. Although much less complex, this system is costly as the counterweights add weight to the primary structure of the aircraft and reduce fuel economy.

Accordingly, it is an object of the present invention to provide a pitch change actuation system which exhibits little or no backlash to interfere with synchrophasing accuracy.

It is a further object of the present invention to provide such a pitch change actuation system having a lower overall weight.

DISCLOSURE OF INVENTION

The pitch change actuation system of the present invention for adjusting the pitch of a variable pitch propeller blade rotatably mounted to a hub of the propeller includes a pitch change actuator operatively connected to the propeller blade and a control valve operatively connected to the pitch change actuator for selectively pressuring the pitch change actuator to effectuate a desired change in the pitch of the propeller blade. The pitch change actuator comprises an annular blade actuation piston operatively connected to the propeller blade whereby longitudinal movement of the blade actuation piston effectuates a rotation of the propeller blade thereby resulting in a change in the pitch of the propeller blade, an annular pitchlock piston having an annular head member and a longitudinally directed annular shaft extending therefrom about the shaft of the blade actuation piston, pitchlock means for operatively interconnected between the pitchlock piston and the blade actuation piston for restraining inadvertent blade pitch reduction, spring means operatively disposed between the pitchlock piston and the blade actuation piston for exerting a preload force against the pitchlock piston whereby movement of the second piston is not transmitted to the blade actuation piston until the preload force is overcome, and conduit means operatively interconnected in fluid communication between the control valve means and the pitch change actuator for selectively directing a pressuring fluid between the control valve and the blade actuation piston thereby providing a first pressure force on the blade actuation piston and the pressuring fluid between the control valve and the second piston thereby providing a second pressure force on the second piston. Lock means may also be provided in operative association with the blade actuation piston for restraining further longitudinal translation of the blade actuation piston when the second pressure force drops below a predetermined pressure level.

The conduit means operatively interconnected in fluid communication between the control valve means and the pitch change actuator may comprise an axially elongated rod-like member disposed to pass longitudinally within the shaft of the blade actuator piston and having a first longitudinally directed passage provided therein for directing the pressurizing fluid between the control valve and the blade actuation piston and a second longitudinally directed passage provided therein for directing the pressuring fluid between the control valve and the second piston.

Alternatively, the conduit means operatively interconnected in fluid communication between the control valve means and the pitch change actuator may comprise a first axially elongated tubular member disposed to pass longitudinally within the shaft of the blade actuator piston and a second axially elongated tubular member disposed coaxially in spaced relationship within and extending longitudinally through the first tubular member thereby defining an annular first longitudinally directed flow passage between the first and second tubular members for directing the pressurizing fluid between the control valve and the blade actuation piston and a second longitudinally directed flow passage within the first tubular member for directing the pressuring fluid between the control valve and the second piston.

The pitchlock means comprises a first annular screw member operatively associated with the second piston whereby longitudinal translation of the second piston effectuates a corresponding rotation of the first screw member, a second annular screw member disposed on the shaft of the blade actuation piston, and an annular linking member disposed coaxially about the shaft of the blade actuation piston between the first and second screw members with the linking member having a first end threaded to the second annular screw disposed on the shaft of the blade actuation piston and a second end connected to the first annular screw member whereby the linking member rotates with the first screw member so as to translate longitudinally along the second screw member, and stop means integral with the linking member for restraining further longitudinal translation of the blade actuation piston in the direction of fine pitch whenever the second pressure force is insufficient to overcome the preload force.

BRIEF DESCRIPTION OF DRAWING

The aforementioned objects, as well as other objects, features and advantages of the present invention will become more apparent in light of the detailed description of the embodiments thereof illustrated in the accompanying drawing, wherein.

BEST MODE FOR CARRYING OUT THE INVENTION

Figure 1:
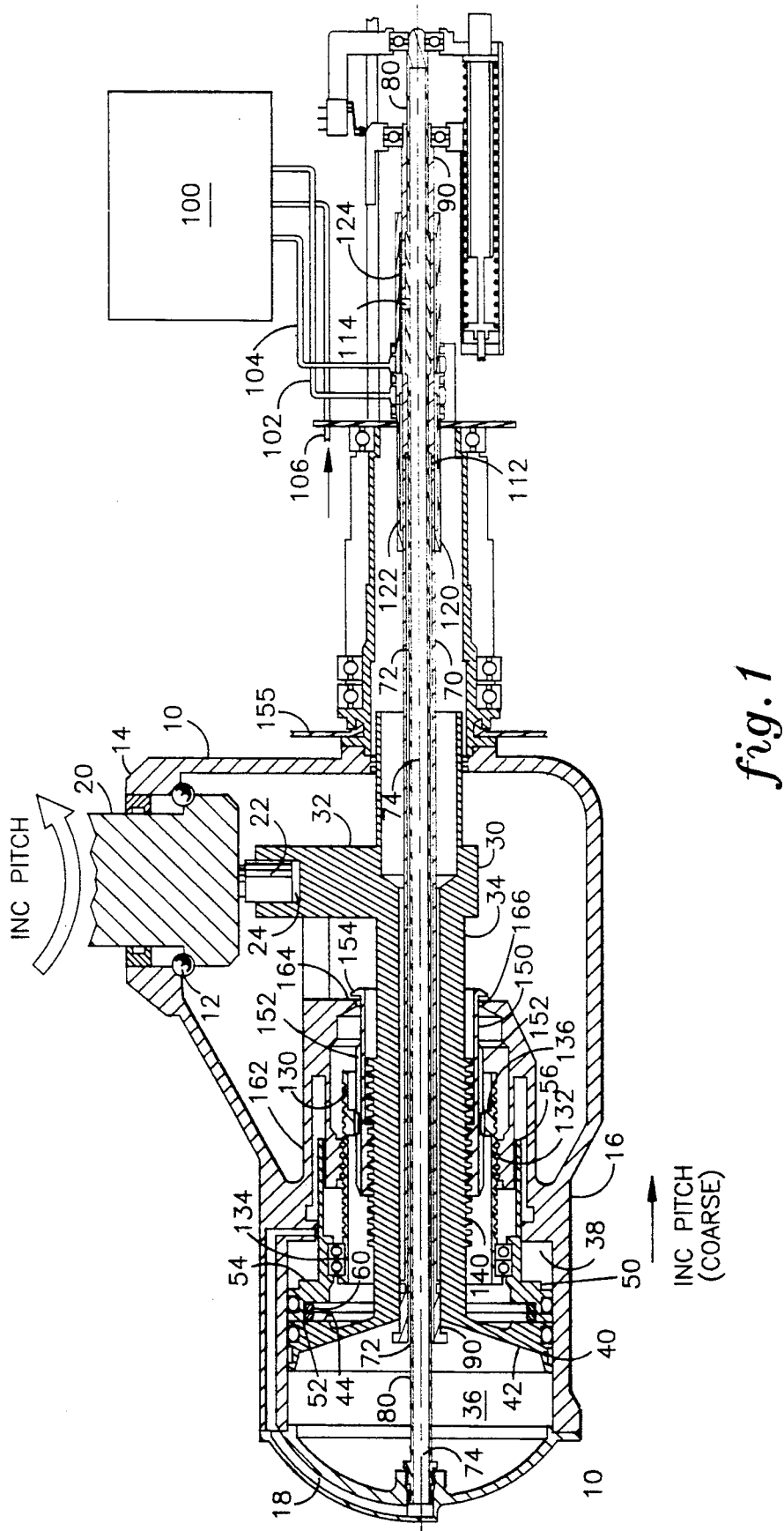
FIG. 1 is a partially sectioned elevational view of a preferred embodiment of the pitch change actuation system.

The present invention is directed to a system for adjusting the pitch of the blades of a variable pitch propeller system of the type suitable for use on propeller driven aircraft. As depicted in the drawing, the propeller system includes a hub 10 into which a plurality of propeller blades 20, of which only one is shown, are mounted. Each blade is mounted at its root end on bearings 12 in an socket 14 in the disc end of the hub 10 so as to be pivotably adjustable for pitch change about its longitudinal axis. The hub 10 has integral therewith a cylindrical housing 16 which extends axially and centrally forward of the disc portion of the hub 10.

An eccentric roller 22 extends outwardly from the lower end of the root portion of the blade 20 and is received within a cam slot 24 of a desired shape provided in the blade actuation piston 30 in the rearward member 32 thereof which extends outwardly at the rearward end of longitudinally extending annular shaft 34 of the blade actuation piston 30. At a location forward of the rearward member 32, the bulkhead 40 of the piston 30 extends outwardly from the annular shaft 34 to the cylindrical hub housing 16 and provides a forward face 42 which is selectively pressurized with a fluid such as hydraulic oil in a manner to be described further hereinafter to cause the blade actuation piston 30 to move along its longitudinal axis in a rearward direction so as to impart coarse pitch, i.e. an increase in pitch, to the blade 20.

To provide for fine pitch adjustment, i.e. a decrease in blade pitch, a second annular piston 50 is disposed within the cylindrical hub housing 16 about the shaft 34 of the blade actuation piston 30. The second annular piston 50, also referred to herein as the pitchlock piston, has a forward face 52 which operates against the blade actuation piston 30 and a rearward face 54 which is selectively pressurized with fluid in a manner to be described further hereinafter to cause the pitchlock piston 50 to push against the blade actuation piston 30 to move the blade actuation piston 30 along its longitudinal axis in the forward direction so as to impart fine pitch to the blade 20. Bias spring means 60 is operatively disposed between the pitchlock piston 50 and the blade actuation piston 30 for exerting a preload force against the pitchlock piston 50 to bias the pitchlock piston 50 away from the blade actuation piston 30. In operation, when the fluid pressure exerted upon the rearward face 54 of the pitchlock piston 50 drops below the preload force and the pitchlock piston 50 backs away from and out of contact with the blade actuation piston 30.

Hydraulic fluid is selectively passed into the cylindrical hub housing through an elongated conduit means 70 and directed against the either the blade actuation piston 30 or the pitchlock piston 50 to cause the movement necessary to change the pitch of the blades 20 to a desired setting. The conduit means 70 is operatively interconnected at its other end in fluid communication with a fluid supply control valve 100 which selectively meters hydraulic fluid from a supply pump (not shown) into either the coarse pitch passageway 72 or the fine pitch passageway 74 of the conduit means 70. The control valve means 100 advantageously comprises a conventional electrohydraulic four-way servoed beta valve of the type well-known in the art which selectively meters the hydraulic fluid from supply conduit 106 to either the coarse pitch passageway 72 or the fine pitch passageway 74 of the conduit means 70 through the coarse pitch conduit 102 or the fine pitch conduit 104, respectively. However, persons skilled in the art will appreciate the various control valves means of the electrohydraulic type or fluid mechanical type, or combinations thereof, may be used with the pitch change actuator of the present invention.

Referring now specifically to FIG. 1, in the embodiment of the present invention illustrated therein, the bulkhead 40 of the blade actuation piston 30 extends outwardly from the forward end of the piston shaft 34 to the inner surface of the cylindrical hub housing 16 so as to from a first fluid chamber 36 within the housing 16 forward of the bulkhead 40 of the blade actuation piston 30. The annular pitchlock piston 50 is disposed about the blade actuation piston shaft 34 in spaced relationship therewith and just rearward of the blade actuation piston 30 so as to form an annular second fluid chamber 38 within the housing 16 rearward of the rearward face 54 of the pitchlock piston 50. The bias spring 60 is disposed in a cavity in the forward face 52 of the pitchlock piston 50 so as to operate between the rearward face 44 of the bulkhead 40 of the blade actuation piston 30 and the forward face 52 of the pitchlock piston 50.

In this embodiment, the conduit means 70 comprises a pair of coaxially disposed longitudinally extending tubular members 80 and 90 which pass axially through the interior of the longitudinally extending shaft 34 of the blade actuation piston 30. The inner tubular member 80 extends from the forward end of the cylindrical hub housing 16 rearwardly along the axis of and through the housing 16 and through the propeller gearbox 155 disposed aft of the hub housing 16, and defines a fine pitch fluid passageway 74 within its interior. The fine pitch fluid passageway 74 is connected at its forward end in fluid communication with the second fluid chamber 38 via conduit 18 in the wall of the hub housing 16 and is connected at its rearward end in fluid communication with the control valve 100 via conduit 104, channel 124 in oil bearing 120 disposed about the outer tubular member 90, and channels 114 which pass through both the wall of the outer tubular member 90 and that of the inner tubular member 80.

The outer tubular member 90 is disposed about the inner tubular member 80 in spaced relationship therewith so as to define a coarse pitch fluid passageway 72 in the annular space formed therebetween. The coarse pitch fluid passageway 72 is connected at its outlet at its forward end directly in fluid communication with the first fluid chamber 36 and is connected at its rearward end in fluid communication with the control valve 100 via conduit 102, channel 122 in oil bearing 120 disposed about the outer tubular member 90, and ports 112 which pass through the wall of the outer tubular member 90.

In the annular space formed between the rearwardly extending shaft 56 of the pitchlock piston 50 and the longitudinally extending shaft 34 of the blade actuation piston 30, there is disposed a first annular screw member 130 operatively associated with the pitchlock piston 50, a second annular screw member 140 disposed on the outer surface of the shaft 34, and an annular linking member 150 coaxially disposed about the shaft 34 between the first and second screw members. In combination, the pitchlock piston 50, the first annular screw member 130, the second annular screw member 140 and the intermediate annular linking member 150 function cooperatively to form a pitchlock mechanism which prevents the blades 20 from inadvertently going toward fine pitch.

As illustrated in FIG. 1, the first screw member advantageously comprises annular ballscrew means 130 rotatably mounted to an interior cylindrical extension 162 of the hub housing 16 via the ball race 132 of the ballscrew means 130 and coupled to the shaft 56 of the pitchlock piston 50 by means of bearing 134 so as to simultaneously translate with and rotate within the pitchlock piston 50. The ballscrew means 130 is operatively connected to the second screw member, which advantageously comprises acme screw 140 machined into the outer surface of the shaft 34, by the linking member 150 which comprises a cylindrical quill threaded at its forwarded end to the acme screw 140 and having spline means 152 on its outer surface which engage tab-like keys 136 depending from the ballscrew means. A pitchlock stop 154 extends outwardly from the rearward end of the quill 150 for engaging the inward extending flange 164 of the hub housing 16 so as to ground the pitchlock mechanism and prevent further movement of the blade actuation piston 34 toward fine pitch in the event of a hydraulic failure.

To increase the pitch of the blades 20 via the pitch actuation system illustrated in FIG. 1, hydraulic fluid is selectively passed from the fluid supply (not shown) into the first fluid chamber 36 via the control valve 100 through conduit 102, thence through channel 122 in oil bearing 120 and ports 112 into and through the annular coarse pitch fluid passageway 72 between the inner tubular member 80 and the outer tubular member 90. The resultant pressurization of the first fluid chamber 36 causes movement of the blade actuation piston 30 rearwardly (to the right in FIG. 1) and a corresponding increase in pitch of the blades 20. As the blade actuation piston 30 moves rearwardly, it also pushes the pitchlock piston 50 rearwardly with it and forces hydraulic fluid within the second fluid chamber 38 to drain therefrom under the control of the control valve 100 back to the fluid supply through conduit 18 and the fine pitch fluid passageway 74. As the fluid drains from the second fluid chamber 38, the fluid pressure force exerted on the rearward face 54 of the pitchlock piston 50 decreases to an equilibrium valve at the new pitch setting. At equilibrium in normal operation, the coarse pitch pressure force acting to the right on the blade actuation piston 30 counter-balances the sum of the blade load and the net fine pitch pressure force on the pitchlock piston 50, both of which act to the left in FIG. 1. As the coarse pitch pressure and the fine pitch pressure must sum, at least approximately, to the supply pressure, and the coarse pitch pressure must adjust to counter changes in the blade load force, the fine pitch pressure will change accordingly.

In the event of a deterioration in supply pressure, it is possible for that the fine pitch pressure could drop to near zero as the coarse pitch pressure increases to counter-balance an increase in blade load. For example, in the event of a leak in the fluid supply system, the supply pressure would decrease as fluid leaks out of the system. The control valve 100 would shuttle in an attempt to maintain the pressure force exerted (to the right) on the blade actuation piston 30 and simultaneously reduce pressure to the second fluid chamber 38. With the supply pressure decreasing at the same time as the flow of coarse pitch fluid is increasing, the fine pitch flow will necessarily deteriorate rapidly. As the supply pressure continues to decrease, the coarse pitch pressure will follow and, if unchecked by a mechanical pitchlock mechanism, the blades will go to lower pitch and an inadvertent undesirable overspeed of the propeller system will occur.

With the pitchlock system of the present invention as illustrated in FIG. 1, in the event that the supply pressure deteriorates to the point that the force exerted by the fine pitch pressure on the rearward face 54 of the pitchlock piston 50 will decrease so as to become less than the preload force exerted on the forward face 52 of the pitchlock piston 50 by the bias spring 60 before the blade load overcomes the counter-balancing force exerted by the coarse pitch pressure on the blade actuation piston 30. At this point, the greater force exerted by the bias spring 60 results in the pitchlock piston being backed away from the blade actuation piston 30 such that the pitchlock piston 50 no longer translates rearwardly with the blade actuation piston 30.

When the pitchlock piston 50 is moving with the blade actuation piston 30 as in normal operation, the ballscrew 130 not only translates therewith but also rotates and causes the quill 150 keyed thereto to also rotate about the shaft 34 of the blade actuation piston 30. This rotation of the quill 150 causes the quill to move on the acme screw 140 to which it is threaded so as to maintain a desired pitchlock gap 166 between the pitchlock stop 154 extending outwardly from the rearward end of the quill 150 for engaging the inward extending flange 164 of the hub housing 16.

As noted above, in the event that the control valve 100 can not supply adequate pressure to maintain the fine pitch pressure force greater than the spring bias force, the pitchlock piston 50 becomes disengaged from the blade actuation piston so as to no longer translate therewith. Consequently, the rotation of the ballscrew 130 also ceases. With the desired pitchlock gap 166 having been maintained, it is assured that the pitchlock stop 154 will quickly ground and prevent any inadvertent fine pitch change even if the blade load overcomes the coarse pitch pressure force such as would occur in the event of the loss of supply pressure.

Figure 2:
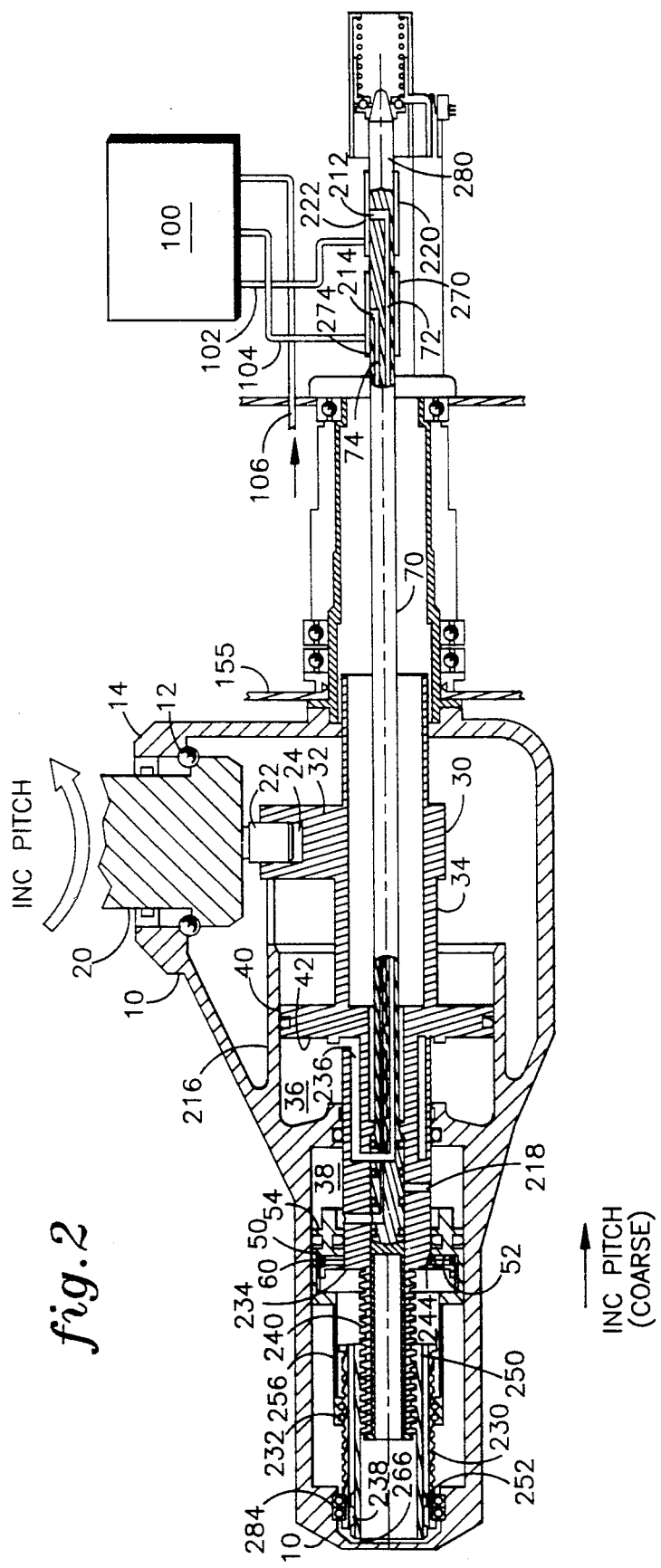
FIG. 2 is a partially sectioned elevational view of an alternate preferred embodiment of the pitch change actuation system.

Referring now specifically to FIG. 2, in the embodiment of the present invention illustrated therein, the bulkhead 40 of the blade actuation piston 30 extends outwardly from an intermediate location on the piston shaft 34 to the inner surface of the cylindrical rearwardly extending flange 216 of hub housing 16 so as to from a first fluid chamber 36 within the housing 16 forward of the bulkhead 40 of the blade actuation piston 30. The annular pitchlock piston 50 is disposed about the blade actuation piston shaft 34 in spaced relationship therewith and forward of the blade actuation piston 30 so as to form an annular second fluid chamber 38 within the housing 16 rearward of the rearward face 54 of the pitchlock piston 50. The bias spring 60 is disposed between the forward face 52 of the pitchlock piston 50 and an annular flange 234 extending outwardly from the shaft 34 forward of the pitchlock piston 50 so as to operate between the rearward face 244 of the annular flange 234 of the blade actuation piston 30 and the forward face 54 of the pitchlock piston 50.

In this embodiment, the conduit means 70 comprises a longitudinally extending cylindrical rod-like member 280 which extends axially into the interior of the longitudinally extending shaft 34 of the blade actuation piston 30. The member 280 extends from the second fluid chamber 38 of the cylindrical hub housing 16 rearwardly along the axis of and through the housing 16 and through the propeller gearbox 155 disposed aft of the hub housing 16. A coarse pitch fluid passageway 72 and a fine pitch fluid passageway 74 are formed within its interior. The coarse pitch fluid passageway 72 is connected at its forward end in fluid communication with the first fluid chamber 36 via channel 236 and is connected at its rearward end in fluid communication with the control valve 100 via conduit 102, channel 222 in oil bearing 220 disposed about the member 280, and port 212. The fine pitch fluid passageway 74 is connected at its forward end in fluid communication with the second fluid chamber 38 via port 218 and is connected at its rearward end in fluid communication with the control valve 100 via conduit 104, channel 274 in oil bearing 270 disposed about the member 280, and channel 214.

In the annular space formed between the forwardly extending shaft 256 of the pitchlock piston 50 and the longitudinally extending shaft 34 of the blade actuation piston 30, there is disposed a first annular screw member 230 operatively associated with the pitchlock piston 50, a second annular screw member 240 disposed on the outer surface of the shaft 34, and an annular linking member 250 coaxially disposed about the shaft 34 between the first and second screw members. In combination, the pitchlock piston 50, the first annular screw member 230, the second annular screw member 240 and the intermediate annular linking member 250 function cooperatively to form a pitchlock mechanism which prevents the blades 20 from inadvertently going toward fine pitch.

As illustrated in FIG. 2, the first screw member advantageously comprises annular ballscrew means 230 rotatably mounted to the hub housing 16 by means of bearing 284 and coupled to the inner wall of the annular shaft 256 of the pitchlock piston 50 via the ball race 232 of the ballscrew means 230 so as to simultaneously translate with and rotate within the pitchlock piston 50. The ballscrew means 230 is operatively connected to the second screw member, which advantageously comprises acme screw 240 machined into the outer surface of the forward end of the shaft 34, by the linking member 250 which comprises a cylindrical quill threaded at its rearward end to the acme screw 240 and having spline means 252 on its outer surface which engage tab-like keys 238 depending from the ballscrew means. The forward-most end of the quill 250 serves as a pitchlock for engaging the inner wall of the forward end of the hub housing 16 so as to ground the pitchlock mechanism and prevent further movement of the blade actuation piston 34 toward fine pitch in the event of a hydraulic failure.

To increase the pitch of the blades 20 via the pitch actuation system illustrated in FIG. 2, hydraulic fluid is selectively passed from the fluid supply (not shown) into the first fluid chamber 36 via the control valve 100 through conduit 102, thence through channel 222 in oil bearing 220 and port 212 into and through the coarse pitch fluid passageway 72 and the channel 236 at the forward end thereof. The resultant pressurization of the first fluid chamber 36 generates a pressure force against the forward face of the bulkhead 40 which causes movement of the blade actuation piston 30 rearwardly (to the right in FIG. 2) and a corresponding increase in pitch of the blades 20. As the blade actuation piston 30 moves rearwardly, the annular flange extending outwardly from its shaft forward of the pitchlock piston 50 pushes the pitchlock piston 50 rearwardly with it and forces hydraulic fluid within the second fluid chamber 38 to drain therefrom under the control of the control valve 100 back to the fluid supply through conduit 218 and the fine pitch fluid passageway 74. As the fluid drains from the second fluid chamber 38, the fluid pressure force exerted on the rearward face 54 of the pitchlock piston 50 decreases to an equilibrium valve at the new pitch setting. At equilibrium in normal operation, the coarse pitch pressure force acting to the right on the forward face of the bulkhead 40 of the blade actuation piston 30 counter-balances the sum of the blade load and the net fine pitch pressure force on the pitchlock piston 50, both of which act to the left in FIG. 1. As the coarse pitch pressure and the fine pitch pressure must sum, at least approximately, to the supply pressure, and the coarse pitch pressure must adjust to counter changes in the blade load force, the fine pitch pressure will change accordingly.

In the event of a deterioration in supply pressure, it is possible for that the fine pitch pressure could drop to near zero as the coarse pitch pressure increases to counter-balance an increase in blade load. For example, in the event of a leak in the fluid supply system, the supply pressure would decrease as fluid leaks out of the system. The control valve 100 would shuttle in an attempt to maintain the pressure force exerted (to the right) on the forward face of the bulkhead 40 of the blade actuation piston 30 and simultaneously reduce pressure to the second fluid chamber 38. With the supply pressure decreasing at the same time as the flow of coarse pitch fluid is increasing, the fine pitch flow will necessarily deteriorate rapidly. As the supply pressure continues to decrease, the coarse pitch pressure will follow and, if unchecked by a mechanical pitchlock mechanism, the blades will go to lower pitch and an inadvertent undesirable overspeed of the propeller system will occur.

With the pitchlock system of the present invention as illustrated in FIG. 2, in the event that the supply pressure deteriorates to the point that the force exerted by the fine pitch pressure on the rearward face 54 of the pitchlock piston 50 will decrease so as to become less than the preload force exerted on the forward face 52 of the pitchlock piston 50 by the bias spring 60 before the blade load overcomes the counter-balancing force exerted by the coarse pitch pressure on the blade actuation piston 30. At this point, the greater force exerted by the bias spring 60 results in the pitchlock piston being backed away from the blade actuation piston 30 such that the pitchlock piston 50 no longer translates rearwardly with the blade actuation piston 30.

When the pitchlock piston 50 is moving with the blade actuation piston 30 as in normal operation, the ballscrew 230 not only translates therewith but also rotates and causes the quill 250 keyed thereto to also rotate about the shaft 34 of the blade actuation piston 30. This rotation of the quill 250 causes the quill to move on the acme screw 240 to which it is threaded so as to maintain a desired pitchlock gap 266 between the forward-most end of the quill 250 for engaging the inner wall of the forward end of the hub housing 16.

As noted above, in the event that the control valve 100 can not supply adequate pressure to maintain the fine pitch pressure force greater than the spring bias force, the pitchlock piston 50 becomes disengaged from the blade actuation piston so as to no longer translate therewith. Therefore, the rotation of the ballscrew 230 also ceases. With the desired pitchlock gap 166 having been maintained, it is assured that the forward end of the quill 250 will quickly ground and prevent any inadvertent fine pitch change in the event of the loss of supply pressure.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A pitch change actuation system for adjusting the pitch of a variable pitch propeller blade rotatably mounted to a hub of a propeller, said pitch change actuation system having a pitch change actuator operatively connected to the propeller blade and a control valve means operatively connected to the pitch change actuator for selectively pressuring the pitch change actuator to effectuate a desired change in the pitch of the propeller blade, characterized in that said pitch change actuator comprises:
    (a) an annular blade actuation piston operatively connected to the propeller blade whereby longitudinal movement of said blade actuation piston effectuates a rotation of the propeller blade thereby resulting in a change in the pitch of the propeller blade, said blade actuation piston having an outwardly extending head member and an annular shaft longitudinally extending therefrom operatively connected at one end to the propeller blade;
    (b) a second annular piston having an annular head member and a longitudinally directed annular shaft extending therefrom disposed in spaced relationship about the shaft of said blade actuation piston;
    (c) spring means operatively disposed between said second piston and said blade actuation piston for exerting a preload force against said second piston so as to bias said second piston away from said blade actuation until the preload force is overcome;
    (d) pitchlock means operatively interconnected between said second piston and said blade actuation piston for restraining inadvertent blade pitch reduction; and
    (e) conduit means operatively interconnected in fluid communication between said control valve means and said pitch change actuator for selectively directing a pressurizing fluid between said control valve means and said blade actuation piston thereby providing a first pressure force on said blade actuation piston and between said control valve means and said second piston thereby providing a second pressure force on said second piston.

2. A pitch change actuator as recited in claim 1 wherein said conduit means operatively interconnected in fluid communication between said control valve means and said pitch change actuator comprises an axially elongated rod-like member disposed to pass longitudinally within the shaft of said blade actuator piston and having a first longitudinally directed passage provided therein for directing the pressurizing fluid between said control valve means and said blade actuation piston and a second longitudinally directed passage provided therein for directing the pressuring fluid between said control valve means and said second piston.

3. A pitch change actuator as recited in claim 1 wherein said conduit means operatively interconnected in fluid communication between said control valve means and said pitch change actuator comprises a first axially elongated tubular member disposed to pass longitudinally within the shaft of said blade actuator piston and a second axially elongated tubular member disposed coaxially in spaced relationship within and extending longitudinally through said first tubular member thereby defining an annular first longitudinally directed flow passage between said first and second tubular members for directing the pressurizing fluid between said control valve means and said blade actuation piston and a second longitudinally directed flow passage within said second tubular member for directing the pressuring fluid between said control valve and said second piston.

4. A pitch change actuator as recited in claim 1 wherein said pitchlock means comprises:
   a. a first annular screw member operatively associated with said second piston whereby longitudinal translation of said second piston effectuates a corresponding rotation of said first screw member;
   b. a second annular screw member disposed on the shaft of said blade actuation piston;
   c. an annular linking member disposed coaxially about the shaft of said blade actuation piston between said first and second screw members, said linking member having a first end threaded to said second screw member disposed on the shaft of said blade actuation piston and a second end connected to said first screw member whereby said linking member rotates with said first screw member so as to translate longitudinally along said second screw member, and
   d. stop means integral with said linking member for restraining further longitudinal translation of said blade actuation piston in the direction of fine pitch whenever the second pressure force is insufficient to overcome the preload force.

* * * * *